Patented Sept. 28, 1926.

1,601,328

UNITED STATES PATENT OFFICE.

HANS SCHLOSSTEIN, OF CHICAGO, ILLINOIS.

ANTIFREEZE COMPOSITION AND PROCESS OF MAKING SAME.

No Drawing.   Application filed May 15, 1926. Serial No. 109,355.

The present invention has for its object to produce a compound to be placed in the water in automobile radiators and elsewhere, to lower the freezing point of the water, which compound shall be cheaper than glycerine which is one of the substances largely used for anti-freezing purposes; and which compound shall not evaporate at the boiling point of water and shall not attack the materials with which it comes in contact in passing through an engine cooling system.

In the manufacture of my improved compound I use glucose as the raw material. A lactic fermentation is started in the glucose and, as the glucose is being changed into hydroxy-propionic and similar acids, a gradual precipitation of these acids, by means of lime is brought about. The resulting calcium salts are separated from the liquid by filtering. The filter cake thus obtained is cooked with a solution of caustic soda or caustic potash until the calcium salts have been completely dissolved. After the cooking operation, the liquid is filtered to separate from it any traces of insoluble calcium salts that may remain, and this filtered liquid after having been evaporated until it has a viscosity similar to that of glycerine, constitutes the final or finished product. This final product, which consists of a solution of sodium or potassium salt of hydroxypropionic and similar acids, has a more or less peculiar odor which, to some persons, might prove disagreeable. In order to neutralize or at least efface this odor, a small quantity of water soluble pine oil or water soluble conifer oil may be added to the same.

My improved compound is used in the same way as glycerine to lower the freezing point of water, and is effective for that purpose as it will not congeal at a temperature of fifty degrees below zero, centigrade. Because of its low freezing point, the fact that it will not evaporate at the temperature of boiling water, and the further fact that it will not attack metals, and the still further fact that it may be produced more cheaply than glycerine, my improved compound may be used most advantageously as an anti-freezing solution for automobile radiators, although its use is not limited to this particular field.

I claim:

1. An antifreezing solution containing the sodium salt of hydroxy-propionic acid.

2. The process of manufacturing an antifreezing compound which consists in setting up a lactic fermentation in glucose, precipitating the acids with lime, filtering out the solids, cooking the filter cake with a solution of caustic soda, and filtering out any insoluble calcium salts remaining in the solution.

3. The method of manufacturing an antifreezing compound which consists in setting up a lactic fermentation in glucose, adding lime, removing the solids and cooking them in a caustic soda solution, and removing traces of insoluble calcium salts.

4. The method of manufacturing an antifreezing compound which consists in setting up a lactic fermentation in glucose, adding lime, removing the solids and cooking them in a caustic soda solution, removing traces of insoluble calcium salts, and concentrating the solution until it becomes viscous.

In testimony whereof, I sign this specification.

HANS SCHLOSSTEIN.